US 6,640,517 B2

(12) United States Patent
Mitchell

(10) Patent No.: US 6,640,517 B2
(45) Date of Patent: Nov. 4, 2003

(54) POLE MOUNTING SYSTEM HAVING UNIQUE BASE AND METHOD OF ASSEMBLY THEREOF

(75) Inventor: James Mitchell, Mequon, WI (US)

(73) Assignee: Ruud Lighting, Inc., Racine, WI (US)

( * ) Notice: Subject to any disclaimer, the term of this patent is extended or adjusted under 35 U.S.C. 154(b) by 0 days.

(21) Appl. No.: 09/891,994

(22) Filed: Jun. 26, 2001

(65) Prior Publication Data

US 2002/0194803 A1 Dec. 26, 2002

(51) Int. Cl.[7] .............................................. E04C 3/30
(52) U.S. Cl. ....................... 52/736.1; 52/736.4; 52/170; 403/187; 403/230; 403/361
(58) Field of Search ................................ 248/519, 548, 248/909, 346.5, 346.03; 362/431; 403/270, 271, 272, 256, 65.1, 65.14, 59, 65.01; 52/170, 736.1, 736.4, 58, 169.13

(56) References Cited

U.S. PATENT DOCUMENTS

| 899,349 | A | | 9/1908 | Steiber | |
|---|---|---|---|---|---|
| 1,292,812 | A | * | 1/1919 | Lachman | 219/107 |
| 1,477,143 | A | * | 12/1923 | McClintock | 403/245 |
| 1,482,036 | A | * | 1/1924 | Schablow | 116/173 |
| 1,906,634 | A | * | 5/1933 | Leake | 52/152 |
| 2,264,489 | A | * | 12/1941 | Tiegler et al. | 248/694 |
| 2,765,907 | A | | 10/1956 | Dunning et al. | |
| 3,324,524 | A | | 6/1967 | Perron et al. | |
| 3,410,995 | A | | 11/1968 | Gray | |
| 3,713,262 | A | * | 1/1973 | Jatcko | 52/98 |
| 3,839,835 | A | * | 10/1974 | Meyer | 52/296 |
| 3,847,334 | A | * | 11/1974 | Forsberg et al. | 248/158 |
| 4,048,776 | A | | 9/1977 | Sato | |
| 4,070,837 | A | | 1/1978 | Sato | |
| 4,079,559 | A | * | 3/1978 | Tenbrummeler | 52/295 |
| 4,438,484 | A | | 3/1984 | Winden | |
| 4,449,170 | A | | 5/1984 | Warshawsky | |
| 4,793,111 | A | * | 12/1988 | Shewchuk | 52/298 |
| 5,117,607 | A | * | 6/1992 | Bourdon | 52/732.3 |
| 5,266,738 | A | | 11/1993 | MacVoy | |
| 5,401,080 | A | * | 3/1995 | Wenzel | 301/132 |
| 5,481,846 | A | * | 1/1996 | Macchietto | 52/720.1 |
| 5,581,868 | A | * | 12/1996 | Bisch | 29/525.08 |
| 5,746,031 | A | * | 5/1998 | Burns | 248/519 |
| 5,820,255 | A | | 10/1998 | Carrington et al. | |
| 5,895,169 | A | * | 4/1999 | Holm et al. | 404/9 |
| 6,003,826 | A | * | 12/1999 | Galloway, III | 248/519 |
| 6,230,585 | B1 | * | 5/2001 | Bator | 248/909 |
| 6,282,861 | B1 | * | 9/2001 | Natelli, Jr. | 52/730.1 |
| 6,336,620 | B1 | * | 1/2002 | Belli | 248/519 |
| 6,427,965 | B1 | * | 8/2002 | McCracken | 248/633 |

* cited by examiner

Primary Examiner—Carl D. Friedman
Assistant Examiner—Nahid Amiri
(74) Attorney, Agent, or Firm—Jansson, Shupe & Munger, Ltd

(57) ABSTRACT

A pole mounting system mountable on a footing and used for supporting vertical structures. The system includes a pole having a lower end terminating in a lower edge, a base plate having an opening, and ears attached transversely to the base plate adjacent to the opening. The pole is secured within the opening in the base plate to allow the base plate to provide improved structural support. The ears are vertically aligned with the pole and are welded to the pole along their upper edges. The lower edge of the pole is also welded to the base plate. The ears can be integrally formed from the base plate in a process whereby, first, interconnected slots are cut into the base plate such that the slots define the ears, and second, the ears are bent upward so that the ears can received the pole. No additional supports or weld pieces are necessary, so that the improved mounting system may provide sufficient support with two pieces, the pole and the base plate.

24 Claims, 9 Drawing Sheets

POLE MOUNTING SYSTEM HAVING UNIQUE BASE AND METHOD OF ASSEMBLY THEREOF

FIELD OF INVENTION

The present invention relates to pole mounting systems and, in particular, to pole and base combinations and their strength against wind forces and the like.

BACKGROUND OF THE INVENTION

A wide variety of pole mounting systems have been used to anchor poles and to provide support against wind loads and the like. These systems have been used for light poles, flag poles, traffic signal supports, highway sign posts, telephone and electricity poles and a variety of other support poles.

Such poles are often very long and encounter great wind loads and other stresses. A common type of pole mounting system utilizes a pole which is hollow, rectangular (e.g., square) in cross-section and includes a base support (or "plate") to which the lower end of the pole is welded or otherwise affixed. The base support typically has bolt holes by which it is attached to bolts set in concrete, although other ground-attachment means may be used.

Some pole mounting systems use a variety of other structures for providing support for the poles. Various structures have been used in supporting each of the above-mentioned product types, and typically involve interconnection of a pole and a base support by welding and/or bolts.

There are a number of problems and shortcomings in pole mounting systems of the prior art. It is to overcome such problems and shortcomings, to provide an improved pole mounting system for affording greater structural support for poles intended to stand for extended periods of time, and to provide a more economical and more efficient method of creating and assembling such pole mounting systems that this invention is directed.

Examples of the diverse forms of pole-to-base interconnection include the those disclosed in U.S. Pat. No. 5,481,846 to Macchietto; U.S. Pat. Nos. 4,048,776 and 4,070,837 to Sato; U.S. Pat. No. 3,410,995 to Gray; and U.S. Pat. No. 899,349 to Steiber.

In many cases, pole mounting systems provide for attachment of the pole to the base only along a horizontal plane of the base where the pole rests on or slips into the base support—for example, by only a weld along such plane. Certain devices of the prior art, including the device of the aforementioned Macchieto patent, have welded the pole to the base along two separate horizontal planes (e.g., the top and bottom of the base plate). However, this system requires a specially designed pole which has a first outer cross-section that fits into the base plate and a second outer cross-section that does not. The manufacture of such a pole can increase costs significantly and only achieve a slight increase in strength and durability.

Other pole mounting systems of the prior art provide for forged or molded supports projecting from the base. These projections eliminate stress concentration in the base, but do not provide any additional structural strength to the pole. Examples are the devices disclosed in the Sato patents.

Certain other prior pole mounting systems utilize additional supports which are welded at a perpendicular angle to both the pole and the base. These additional supports provide increased structural support to the pole, but require additional material and labor costs. One example of such structure is disclosed in the aforementioned Gray patent.

The aforementioned Steiber patent discloses a post mounting system (for a product used inside buildings) utilizing rivets to attach a post to ears which are formed from a base and inserted into the inside of the post, the lower end of which rests on top of the base plate. Such structure would not provide the support necessary for outdoor pole installations.

Many pole mounting structures require multiple parts in addition to the pole and base in order to provide sufficient structural support. These parts can increase the expense of the pole mounting structure as well as the time needed for assembly. Eliminating or substantially reducing the number of parts necessary to provide sufficient structural support is highly desirable.

There is a continuing need in the field of pole mounting systems, particularly with pole structures intended to withstand large stresses encountered outdoors, for improvements in structural strength and wind resistance, while retaining efficiency in manufacturing and assembly.

OBJECTS OF THE INVENTION

Therefore, it is a primary object of the present invention to provide an improved pole mounting system for supporting poles and other vertical structures.

A principal object of the invention is to provide an improved pole mounting system which exhibits greatly increased wind resistance.

Another object of the invention is to provide an improved pole mounting system which enjoys strong structural support without adding parts.

Another object of the invention is to provide an improved pole mounting system which is easily assembled.

Another object of the invention is to provide an improved pole mounting system which is easily and efficiently manufactured.

Another object of the invention is to provide an improved pole mounting system which does not require specially and expensively produced poles.

Another object of the invention is to provide an improved pole mounting system which has highly versatile functionality.

Another object of the invention is to provide an improved pole mounting system which provides lasting support for outdoor lighting poles.

Still another object of the invention is to provide an improved pole mounting system which provides increased support to the pole while eliminating stress concentration in the base.

Still another object of the invention is to provide an improved pole mounting system which provides increased support to the pole while eliminating stress concentration in the footing.

Yet another object of the invention is to provide an improved pole mounting system which provides increased structural support through the use of multiplanar welds.

These and other objects of the invention will be apparent from the invention disclosure which follows.

BRIEF SUMMARY OF THE INVENTION

In accordance with the present invention, a pole mounting system having increased structural support is provided for mounting on a footing or the like. The pole mounting system of this invention overcomes certain problems and shortcomings of the prior art, including those noted above, and provides a unique base plate satisfying a number of specific mounting needs.

The pole mounting system of the invention, which is mountable on a footing, includes: (1) a substantially horizontal base plate having a top and a bottom; (2) an opening in the base plate; (3) at least one upright ear attached to the base plate adjacent to the opening and terminating in an upper edge; and (4) a pole having a lower end terminating in a lower edge, the lower end being receivable within the opening and welded to each ear along at least a portion of the upper edge thereof.

In highly preferred embodiments, the upright ears are integrally formed with the base plate. In certain of such preferred embodiments, the upright ears are formed by a process of cutting interconnected slots into the base plate, such that the slots define at least one ear, and then bending each ear upwardly from the top surface of the base plate, such that the resulting upright ears are adjacent to the opening.

In preferred embodiments, the lower end of the pole is welded to the base plate along the entire upper edge of each ear. It is highly preferred that at least a portion of the lower edge, and most preferably the entire lower edge, of the pole be welded to the bottom of the base plate.

In certain preferred embodiments, four upright ears project upwardly from the base plate. In highly preferred embodiments, the four ears are "tulip-petal" shaped, as further described herein. The pole, which may be hollow, in such cases has four sides and a quadrilateral cross-section, most preferably square.

In certain other preferred embodiments, the pole has three sides, and three upright ears project upwardly from the base plate. Regardless of the number of sides the pole has, it is preferred that each side of the pole be attached to an ear projecting upwardly from the base plate, since this maximizes the structural support.

In certain other embodiments, the pole has other shapes as are known in the art. Regardless of the shape of the pole, it is preferred that the external surface of the pole is secured to the base plate along ears projecting upwardly from the base plate.

In many embodiments of this invention, the pole supports at least one lighting fixture, and the base plate is secured to a footing.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment. In the drawings.

DETAILED DESCRIPTION OF PREFERRED EMBODIMENTS

Figure 1:
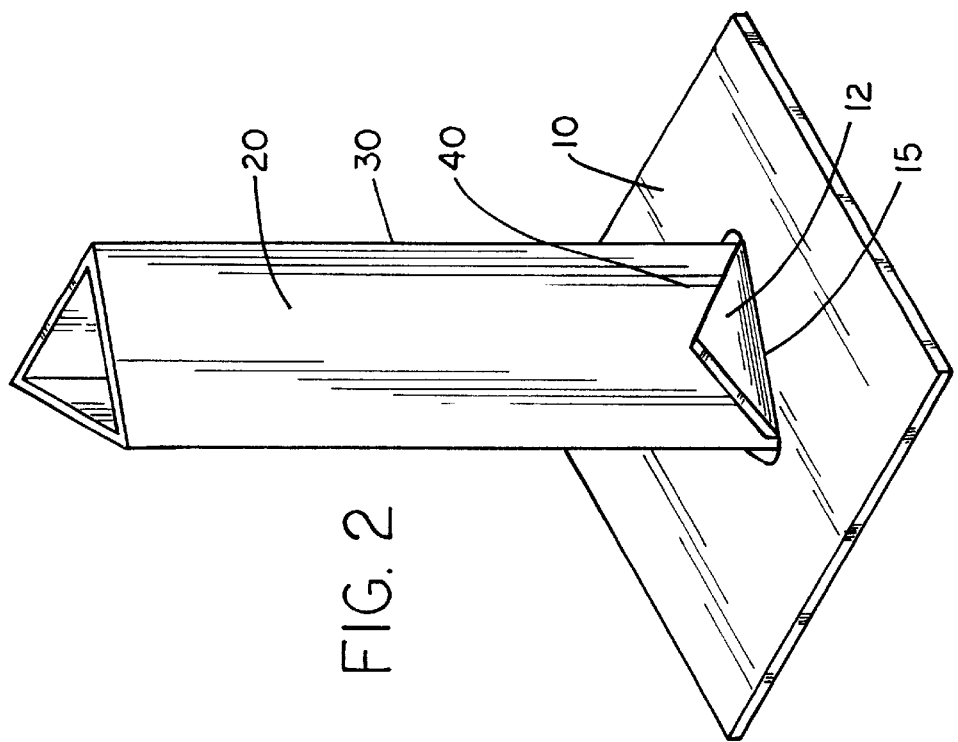
FIG. 1 is a perspective view of a pole mounting system, having a pole with a quadrilateral cross-section, in accordance with the present invention.

Referring to FIG. 1, a pole mounting system in accordance with the present invention is generally designated by the reference numeral 30. Pole mounting system 30 attaches lower end 40 of pole 20 to a base plate 10 for providing improved structural support. Pole 20 has a quadrilateral cross-section, is preferably metal, and is preferably hollow. Wiring or tubing may run through pole 20, depending on the utility of the vertical structure.

Base plate 10 is preferably metal and is oriented generally perpendicularly to the pole 20, as shown. Four ears 12 (two are not shown) are attached to base plate 10 at junction 15. The ears 12 are aligned vertically with the pole 20 and are welded to lower end 40 along at least a portion of the upper edges 13. The junctions 15 bound an opening in the base plate 10, into which the pole 20 is positioned. Optionally, welds may be used to further attach the lower end 40 to the base plate 10 along at least a portion of the lower edge of the pole.

Figure 2:
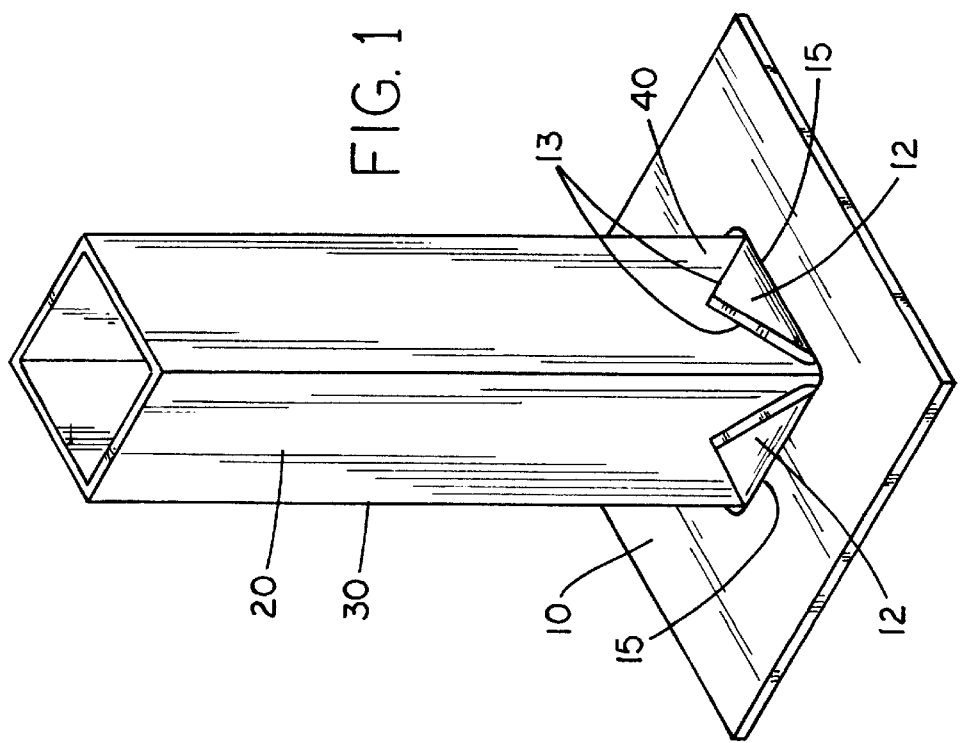
FIG. 2 is a perspective view, of a further pole mounting system, having a pole with a triangular cross-section, in accordance with the present invention.

FIG. 2 shows a pole mounting system 30 that is similar to the pole mounting system 30 shown in FIG. 1, but depicts a pole 10 which has a triangular cross section. In this embodiment, three ears (two are not shown) are attached to the base plate 10 at junctions 15. The ears 12 are aligned vertically with the pole 20 and are welded to the lower end 40 along at least a portion of the upper edges 13. The junctions 15 bound an opening in the base plate 10, into which the pole 20 is positioned. Optionally, welds may be used to further attach the lower end 40 to the base plate 10 along at least a portion of the lower edge of the pole.

Figure 3:
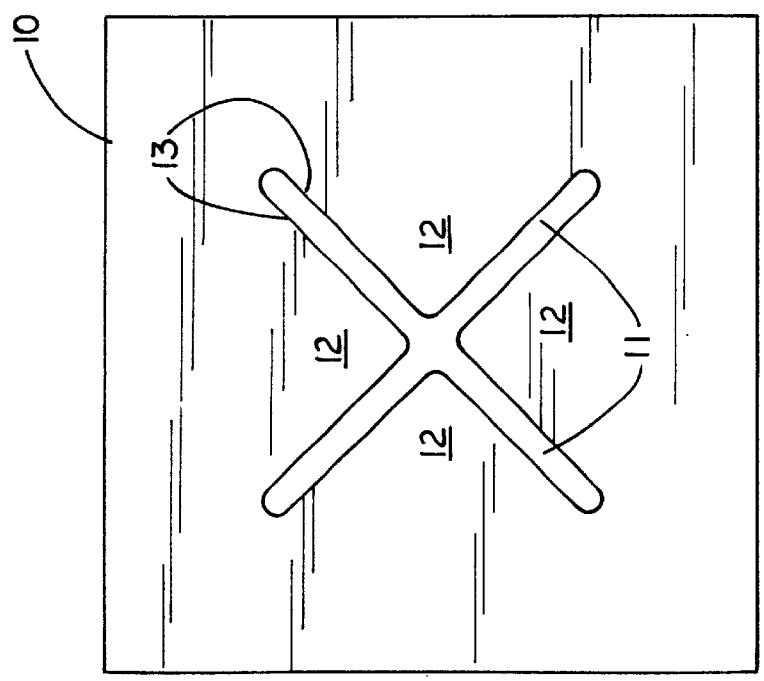
FIG. 3 is a overhead view of the base plate with a four ear configuration, as seen in FIG. 1, before the ears are bent.

FIG. 3 shows the base plate 10 of FIG. 1, during the preferred method of production after interconnected slots 11 are cut, but before the ears 12 are bent. In the preferred method of production, the ears 12 are bent upward so that lower end 40 engages ears 12 when pole 20 is placed into the opening in base plate 10.

Figure 4:
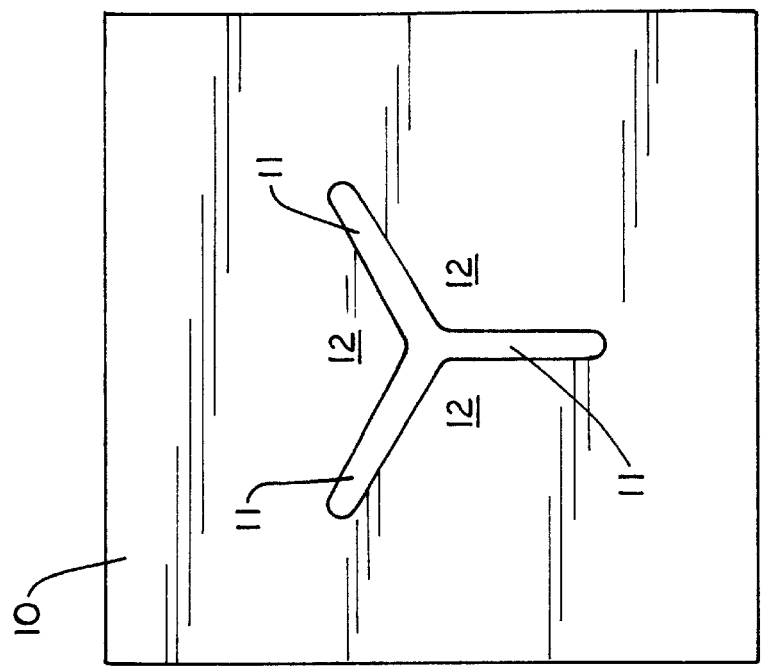
FIG. 4 is a overhead view of an alternate embodiment of the base plate with a three ear configuration as seen in FIG. 2, before the ears are bent.

FIG. 4 shows the base plate 10 of FIG. 2, during the preferred method of production after interconnected slots 11 are cut, but before the ears 12 are bent. In the preferred method of production, the ears 12 are bent upward so that lower end 40 engages ears 12 when pole 20 is placed into the opening in base plate 10.

Figure 5B:
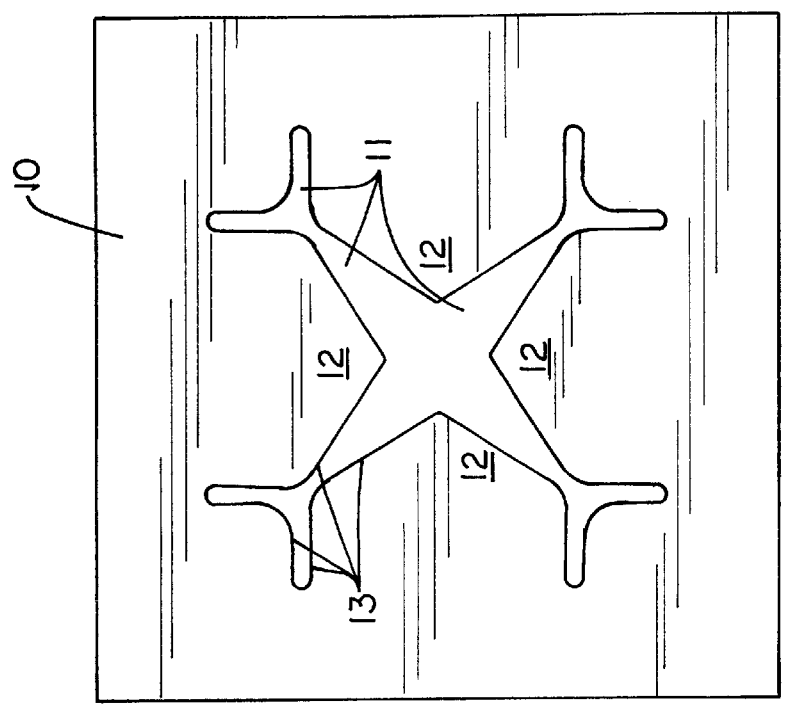
FIG. 5b is an overhead view of the preferred embodiment of the base plate.
Figure 5A:
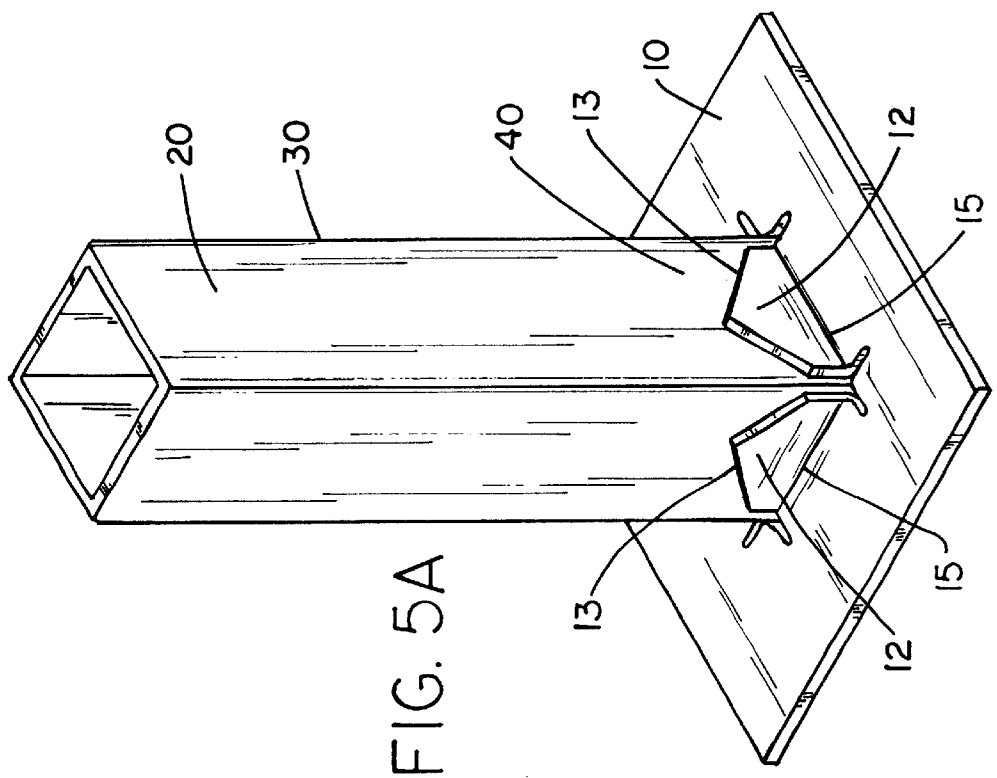
FIG. 5a is a perspective view of the preferred embodiment of the pole mounting system, having a pole with a quadrilateral cross-section and more complicated interconnected slots.

FIG. 5a shows the preferred embodiment of the pole mounting system 30 having "tulip shaped" ears 12. As can be seen, the pole mounting system 30 positions a lower end 40 of pole 20 within the opening in the base plate 10. Pole 20 has a quadrilateral cross-section, is preferably metal and is preferably hollow. Wiring or tubing may run through pole 20, depending on the utility of the vertical structure.

Base plate 10 is preferably metal and is oriented generally perpendicularly to the pole 20, as shown. Four ears 12 (two are not shown) are attached to base plate 10 at junction 15. The ears 12 are aligned vertically with the pole 20 and are welded to lower end 40 along at least a portion of the upper edges 13. The junctions 15 bound an opening in the base plate 10, into which the pole 20 is positioned. Optionally, welds may be used to further attach the lower end 40 to the base plate 10 along at least a portion of the lower edge of the pole.

Referring to FIG. 5b, the preferred embodiment of the base plate 10 of the pole mounting system is shown during the preferred method of production after interconnected slots 11 are cut, but before the ears 12 are bent. In the preferred method of production, the ears 12 are bent upward so that lower end 40 engages ears 12 when pole 20 is placed into the opening in base plate 10.

As can be seen, this embodiment of the base plate 10 includes the preferred "tulip shaped" ears 12 which are more complicated than those shown in FIGS. 3 and 4. This modification allows for improved bending of the ears to their upright position, and may reduce stress at the corners of the opening. The base plate 10 may include a plurality of holes (not shown) for allowing the base plate to be bolted or otherwise secured to a footing.

Figure 5C:
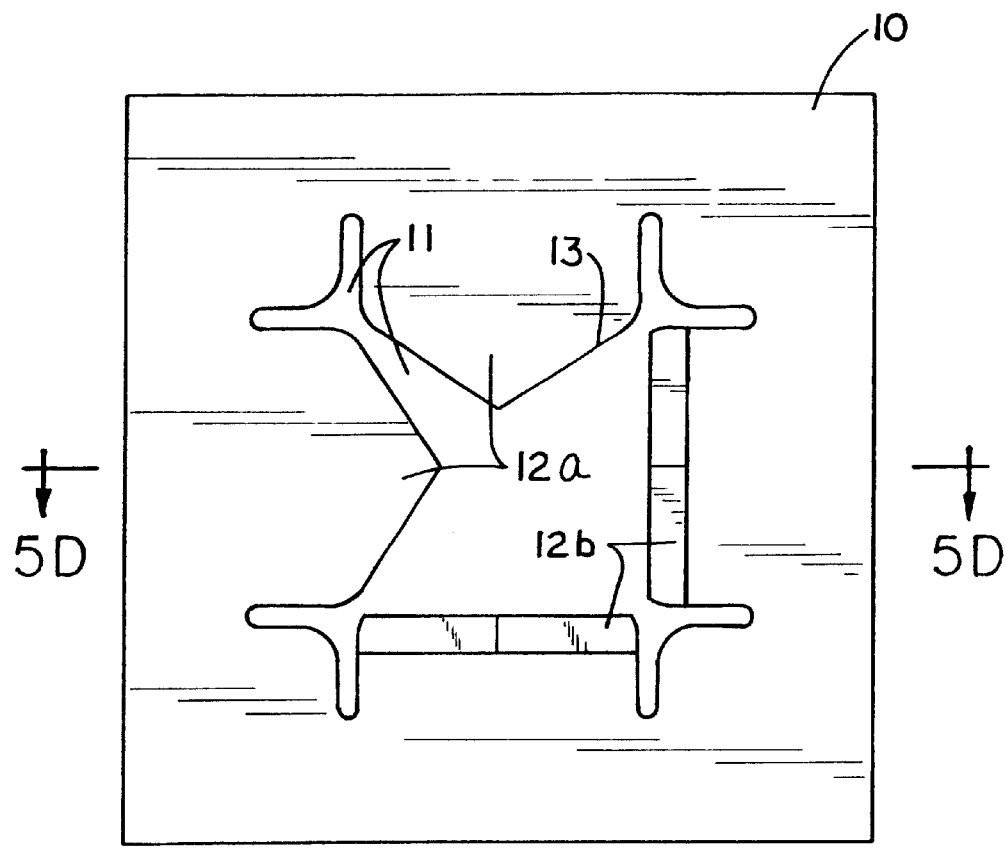
FIG. 5c is an overhead view of the preferred embodiment of the base plate, showing two ears bent up.
Figure 5D:
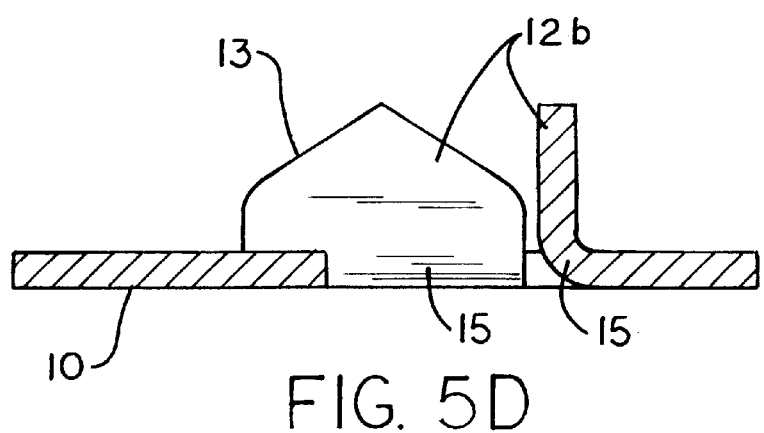
FIG. 5d is a semi-exploded side view of the preferred embodiment of the base plate, showing two ears bent up.

Referring to FIGS. 5c and 5d, the preferred embodiment of the base plate 10 of the pole mounting system is shown during the preferred method of production after two ears 12b are bent, but before the other two ears 12a are. As can be seen, the bent ears 12b are adjacent to opening 14 in the base plate 10. This opening 14 has a quadrilateral shape after all the ears 12 are bent and engages the lower end 40 of pole 20.

Figure 5E:
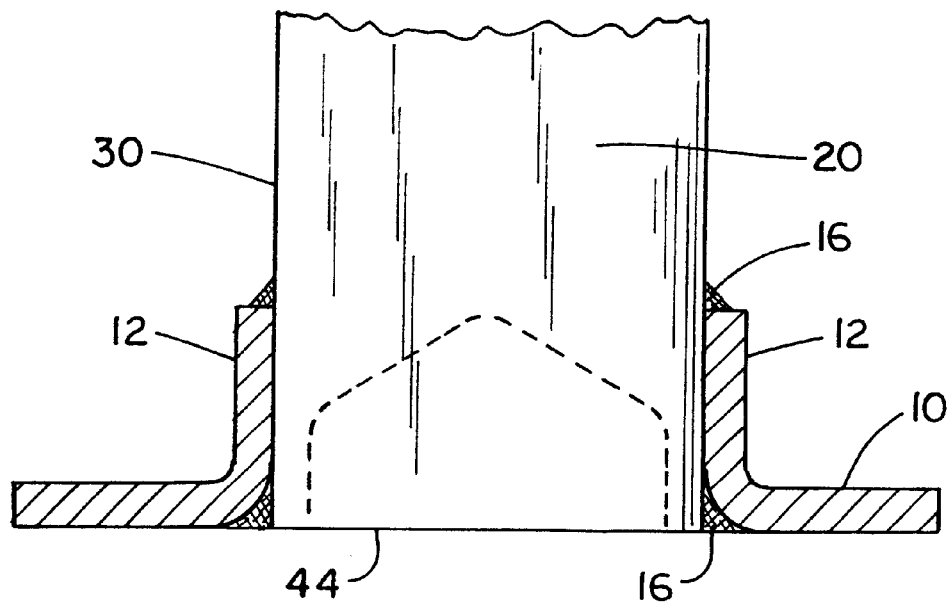
FIG. 5e is an exploded cross-section view of the preferred embodiment of the pole mounting system.

FIG. 5e shows a preferred embodiment of the pole mounting system 30. It shows the welding areas 16 along the upper edges 13 and the along the lower edge 44 of the pole 20. Although it is not shown, it is understood that welding areas 16 are positioned along substantially all of the upper edges 13.

Figure 5F:
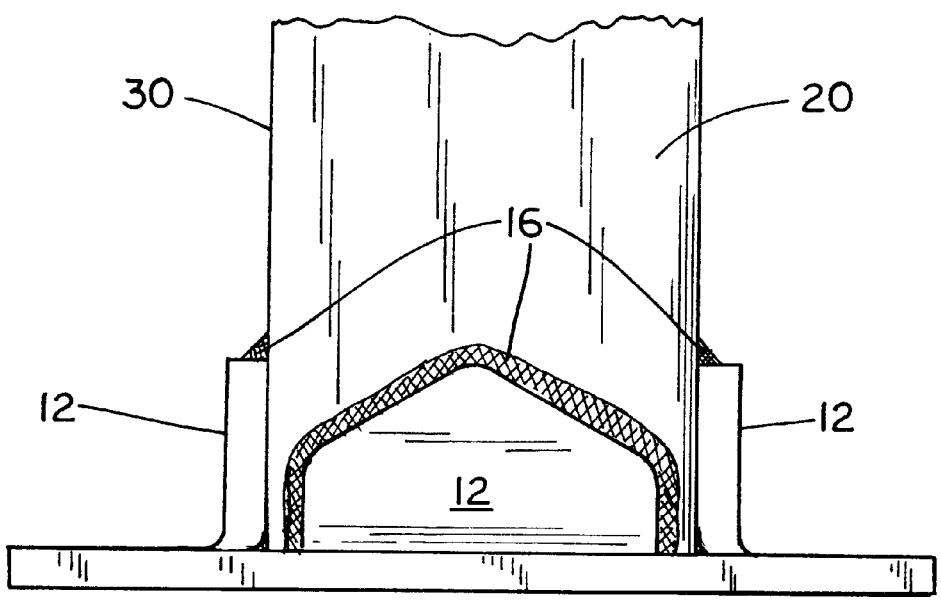
FIG. 5f is a side view of the preferred embodiment of the pole mounting system.

FIG. 5f shows a preferred embodiment of the pole mounting system 30. It shows the welding areas 16 along the slot-edges bordering the ears. Although it is not shown, it is understood that the welding areas 16 are positioned along substantially all of the lower edge 44 of the pole 20.

Figure 6A:
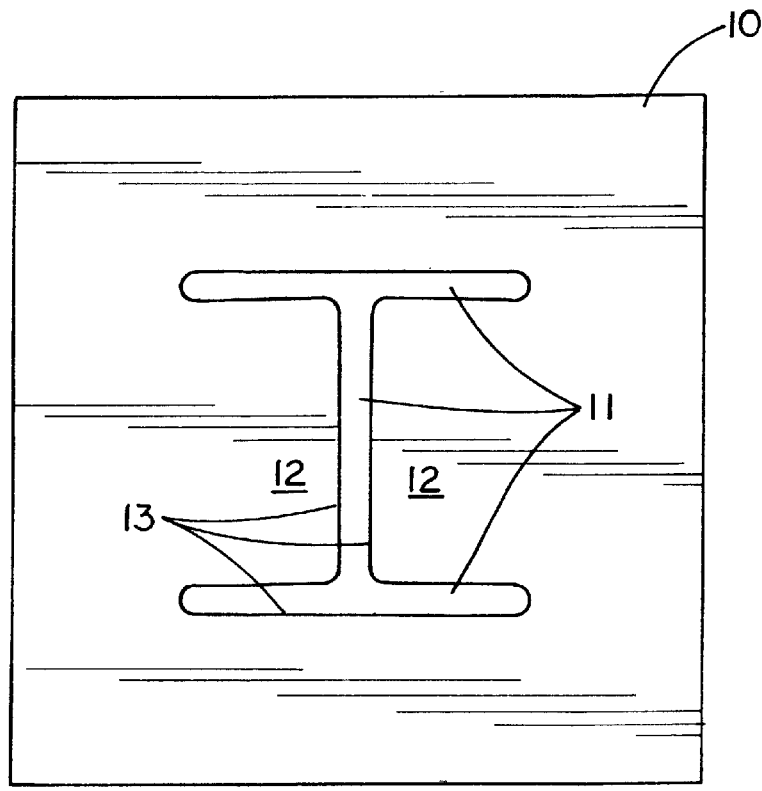
FIG. 6a is an overhead view of an alternative embodiment of the base plate.

FIG. 6a shows another embodiment of the base plate during the preferred method of production after interconnected slots 11 are cut, but before the ears 12 are bent. In this embodiment two ears 12 are formed.

Figure 6B:
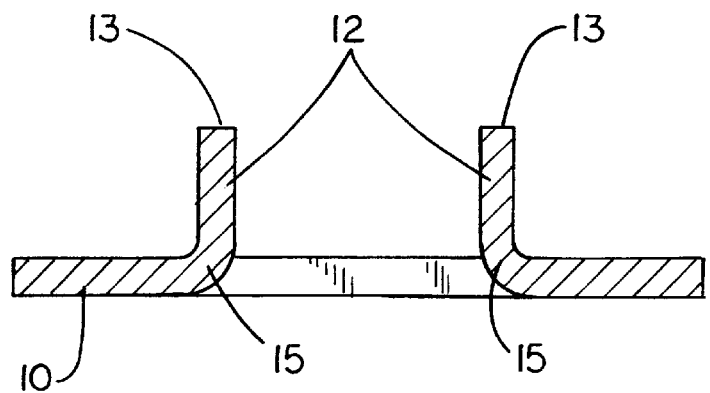
FIG. 6b is a semi-exploded side view of an alternative embodiment of the base plate showing both ears bent up.

FIG. 6b shows the embodiment of FIG. 6a after the two ears 12 have been bent upwardly. In such an embodiment, the opening created by the bending of the ears 12 is not entirely bounded by the junctions 15.

Figure 7A:
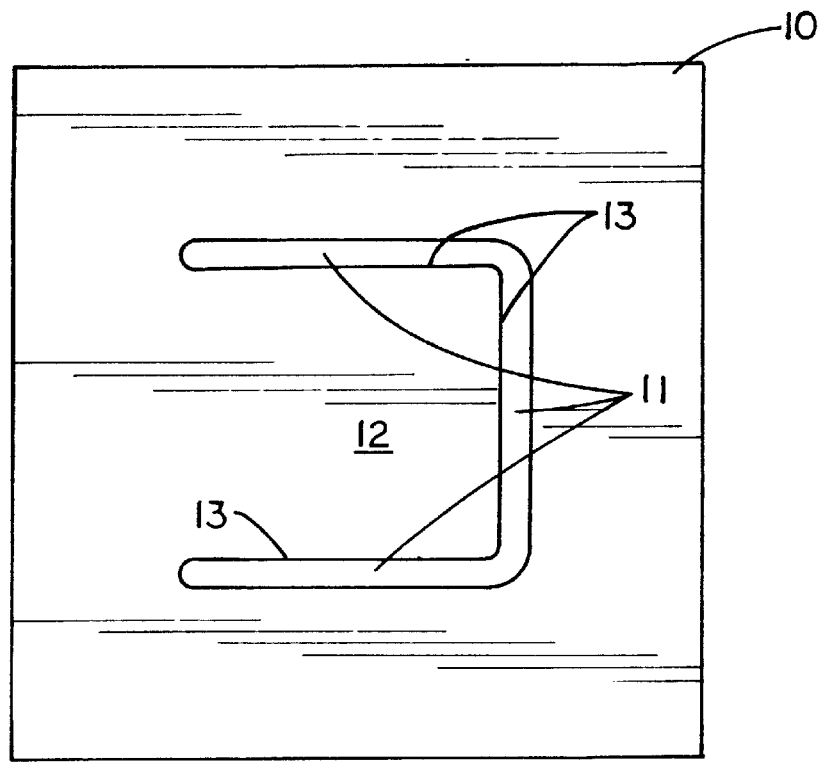
FIG. 7a is an overhead view of an alternative embodiment of the base plate.

FIG. 7a shows another embodiment of the base plate during the preferred method of production after interconnected slots 11 are cut, but before the ear 12 is bent. In this embodiment one ear 12 is formed.

Figure 7B:
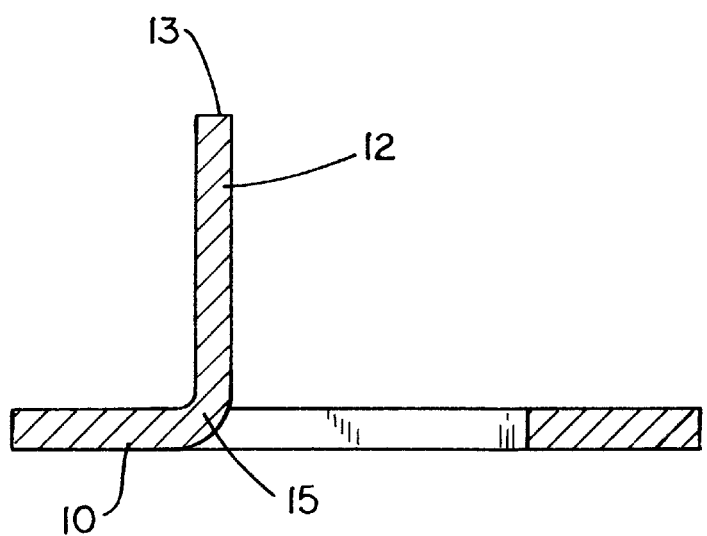
FIG. 7b is a semi-exploded side view of an alternative embodiment of the base plate showing both ears bent up.

FIG. 7b shows the embodiment of FIG. 7a after the ear 12 has been bent upwardly. In such an embodiment, the opening created by the bending of the ears 12 is not entirely bounded by the junction 15.

Figure 8A:
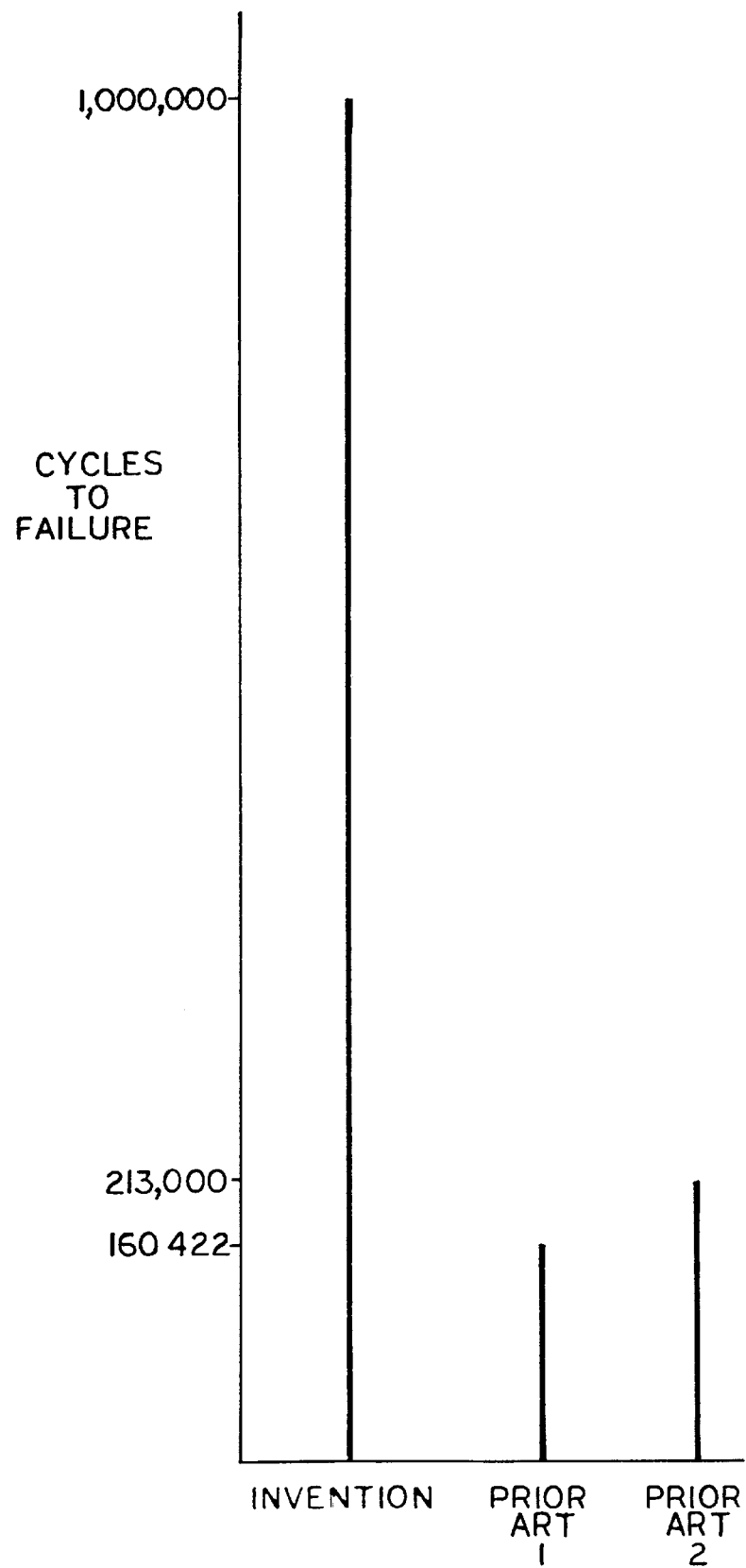
FIG. 8 is a table showing fatigue data for the preferred embodiment of the invention and prior art devices.
Figure 8B:
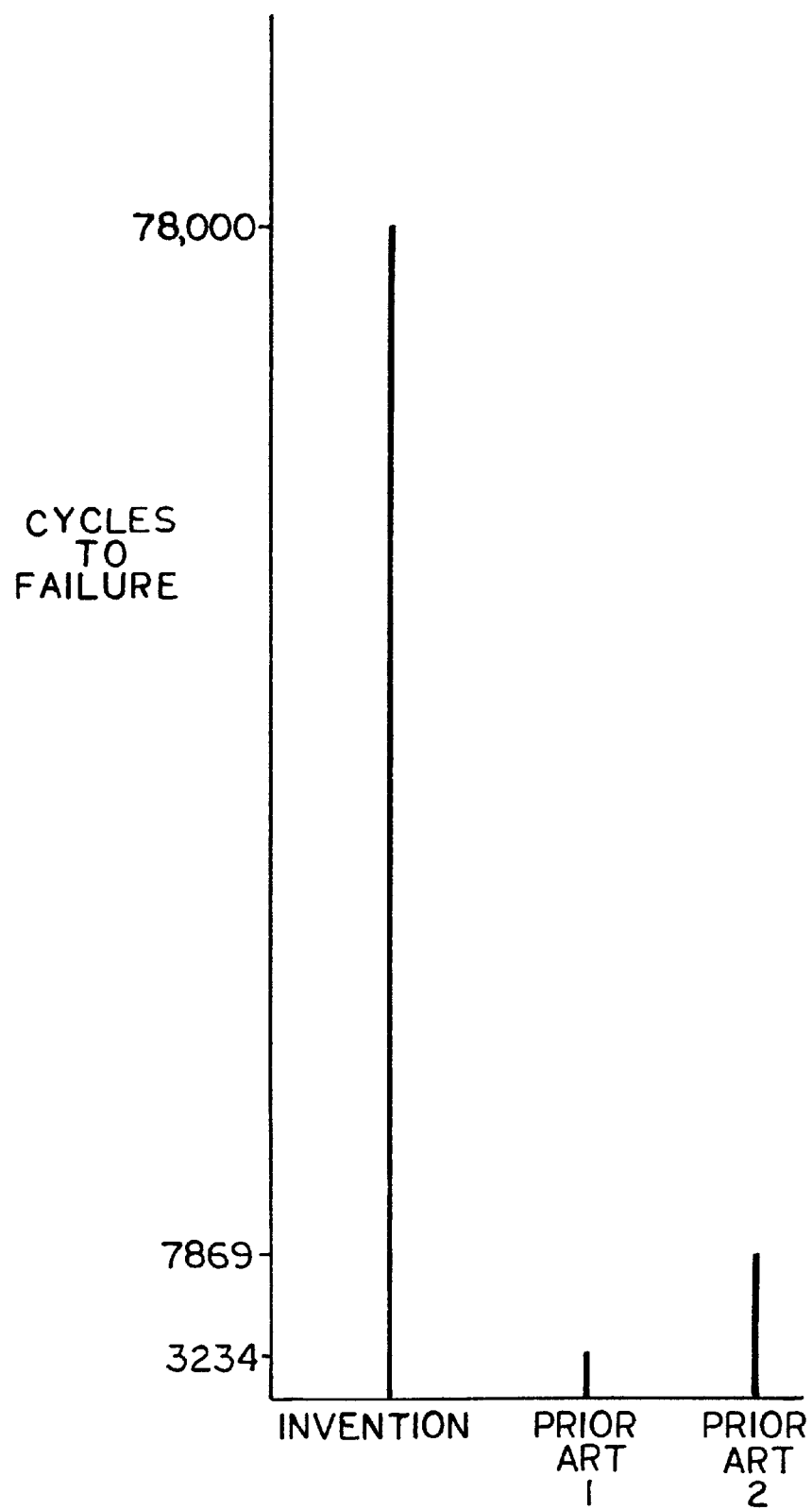

FIG. 8 shows fatigue data for various embodiments of pole mounting structures. The data was attained from tests which applied various loads to poles attached to a bases. The loads were applied at a perpendicular angle to the pole nine (9) feet from the base. As can be seen, the preferred embodiment (depicted by squares) demonstrates a great increase in strength and endurance compared to prior art devices currently used.

When a load of 200 pounds was applied to a pole nine (9) feet from the base, the new design did not fail until the load had been applied for 1,000,000 cycles. Applying the same test to two commonly used pole mounting systems resulted in failures at 160,422 and 213,000 cycles respectively. When a load of 500 pounds was applied to a pole nine (9) feet from the base, the new design did not fail until the load had been applied for 78,000 cycles. Applying the same test to two commonly used pole mounting structures resulted in failures at 3234 cycles and 7869 cycles respectively. As evidenced by this above data, the new pole mounting structure exhibits a significant increase in strength and endurance.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

We claim:

1. A pole mounting system, comprising:
   a substantially horizontal base plate having a top and bottom and an opening;
   at least one upright ear attached to the base plate adjacent to the opening and terminating in an upper edge; and
   a pole having at least three sides, a lower end terminating in a lower edge, the lower end being received within the opening with each ear along a respective side of the pole and being secured thereto by a weld along the upper edge of each ear,
   whereby the base plate provides structural support to the pole.

2. The pole mounting system of claim 1 wherein each ear is integrally formed with the base plate.

3. The pole mounting system of claim 1 wherein the lower end is secured to the base plate by a weld along the entire upper edge of each ear.

4. The pole mounting system of claim 1 wherein the lower edge of the pole is welded to the bottom of the base plate.

5. The pole mounting system of claim 4 wherein the lower edge of the pole is welded to the bottom of the base plate along the entirety of the lower edge.

6. The pole mounting system of claim 1 wherein the pole is utilized for lighting purposes.

7. The pole mounting system of claim 1 wherein the pole is hollow.

8. The pole mounting system of claim 1 wherein the base plate has four ears.

9. The pole mounting system of claim 8 wherein the pole has four sides.

10. The pole mounting system of claim 9 wherein the pole has a quadrilateral cross section.

11. The pole mounting system of claim 10 wherein the lower edge of the pole is welded to the bottom of the base plate.

12. The pole mounting system of claim 1 wherein the base plate has three ears.

13. The pole mounting system of claim 12 wherein the pole has three sides.

14. A pole mounting system, comprising:

a base plate having a top and bottom and an opening;

at least one ear extending upwardly from the base plate adjacent to the opening and terminating in an upper edge;

a pole having a lower end terminating in a lower edge, the lower end being received within the opening and being secured thereto by a weld along the upper edge of each ear, whereby the base plate provides structural support to the pole.

15. The pole mounting system of claim 14 wherein the lower end is secured to the base plate by a weld along the entire upper edge of each ear.

16. The pole mounting system of claim 14 wherein each ear is integrally formed with the base plate.

17. The pole mounting system of claim 14 wherein the lower edge of the pole is welded to the bottom of the base plate.

18. The pole mounting system of claim 14 wherein the pole has at least 3 sides.

19. The pole mounting system of claim 18 wherein the lower end is received within the opening with each ear along a respective side of the pole and being secured thereto by a weld along the upper edge of each ear.

20. A method for supporting a pole having a lower end terminating in a lower edge with a base plate having a top and bottom and an opening, comprising:

forming in the base plate at least one upright ear terminating in an upper edge such that each upright ear is adjacent to the opening;

positioning the lower end of the pole in the opening, such that the pole is completely bounded by the opening; and welding the lower end to the base plate along the upper edge of each upright ear, whereby the base plate provides structural support to the pole.

21. The method of claim 20, further comprising welding the lower edge of the pole to the bottom of the base plate.

22. The method of claim 20 wherein the forming step includes:

cutting interconnected slots into the base plate, the slots defining at least one ear; and bending each at least one ear upwardly, whereby each upright ear is formed integrally with the base plate and defines the opening.

23. The method of claim 22 further comprising mounting the base plate to a footing.

24. The mounting system of claim 1 further comprising a footing, the bottom of the base plate secured to the footing and eliminating stress concentration in the footing.

* * * * *